United States Patent [19]

West et al.

[11] Patent Number: 4,952,857
[45] Date of Patent: Aug. 28, 1990

[54] SCANNING MICROMECHANICAL PROBE CONTROL SYSTEM

[75] Inventors: Paul E. West; Wilfred P. Charette, both of Glendale; Arthur Young, Temple City, all of Calif.

[73] Assignee: QuanScan, Inc., Pasadena, Calif.

[21] Appl. No.: 328,422

[22] Filed: Mar. 24, 1989

[51] Int. Cl.⁵ .............................................. G05B 13/00
[52] U.S. Cl. ................................. 318/561; 318/603; 318/573; 318/571; 250/306; 219/69.18
[58] Field of Search ............... 318/561, 603, 573, 571; 250/306; 219/69.18

[56] References Cited

U.S. PATENT DOCUMENTS

| | | | |
|---|---|---|---|
| 3,918,348 | 11/1975 | Runft | 90/11 R |
| 3,969,615 | 7/1976 | Bowers et al. | 318/573 X |
| 4,004,123 | 1/1977 | Inoue | 219/69.18 |
| 4,254,368 | 3/1981 | Ido et al. | 318/603 |
| 4,287,461 | 9/1981 | Promis et al. | 318/571 |
| 4,458,190 | 7/1984 | Takawashi et al. | 318/603 |
| 4,521,660 | 6/1985 | Inoue | 219/69.18 |
| 4,750,104 | 6/1988 | Kumamoto et al. | 364/167 |
| 4,806,755 | 2/1989 | Duerig et al. | 250/306 |

Primary Examiner—William M. Shoop, Jr.
Assistant Examiner—Saul M. Bergmann
Attorney, Agent, or Firm—Fulwider, Patton, Lee & Utecht

[57] ABSTRACT

The scanning micromechanical probe control system for controlling relative movement between a sensor probe and an adjacent sample surface includes a sensor probe for measuring a parameter which varies relative to the relative positioning of the probe and the adjacent surface adapted to generate an error signal indicating one of at least two discrete position conditions; an up-/down counter for integrating the error signal and for generating an up/down count signal; and a position control servo for controlling the relative positioning of the probe and the surface responsive to the up/down count signal. An adaptive feedback control most preferably controls the rate of up/down positioning of the sensor probe and the rate of raster scanning of the probe relative to the target surface.

11 Claims, 4 Drawing Sheets

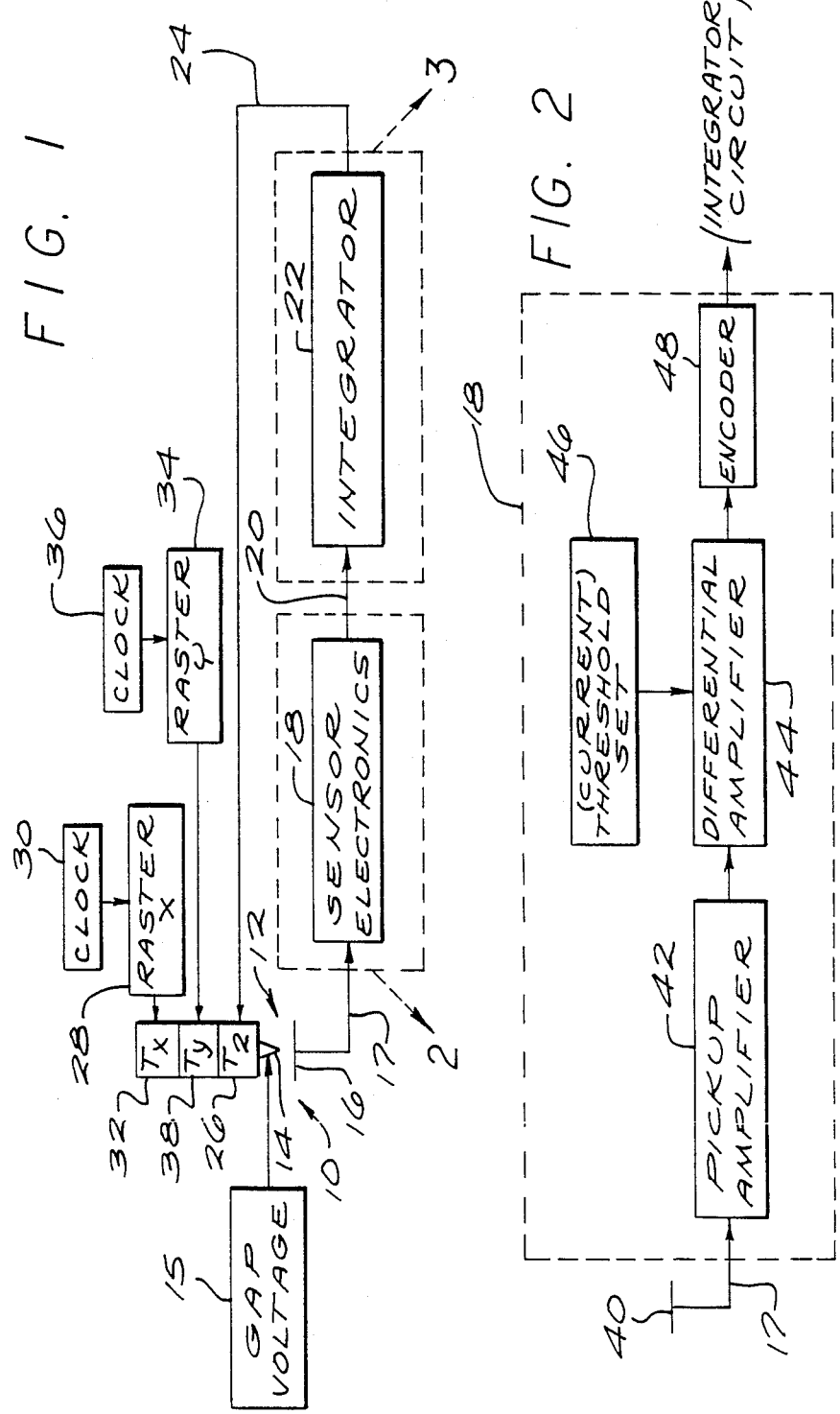

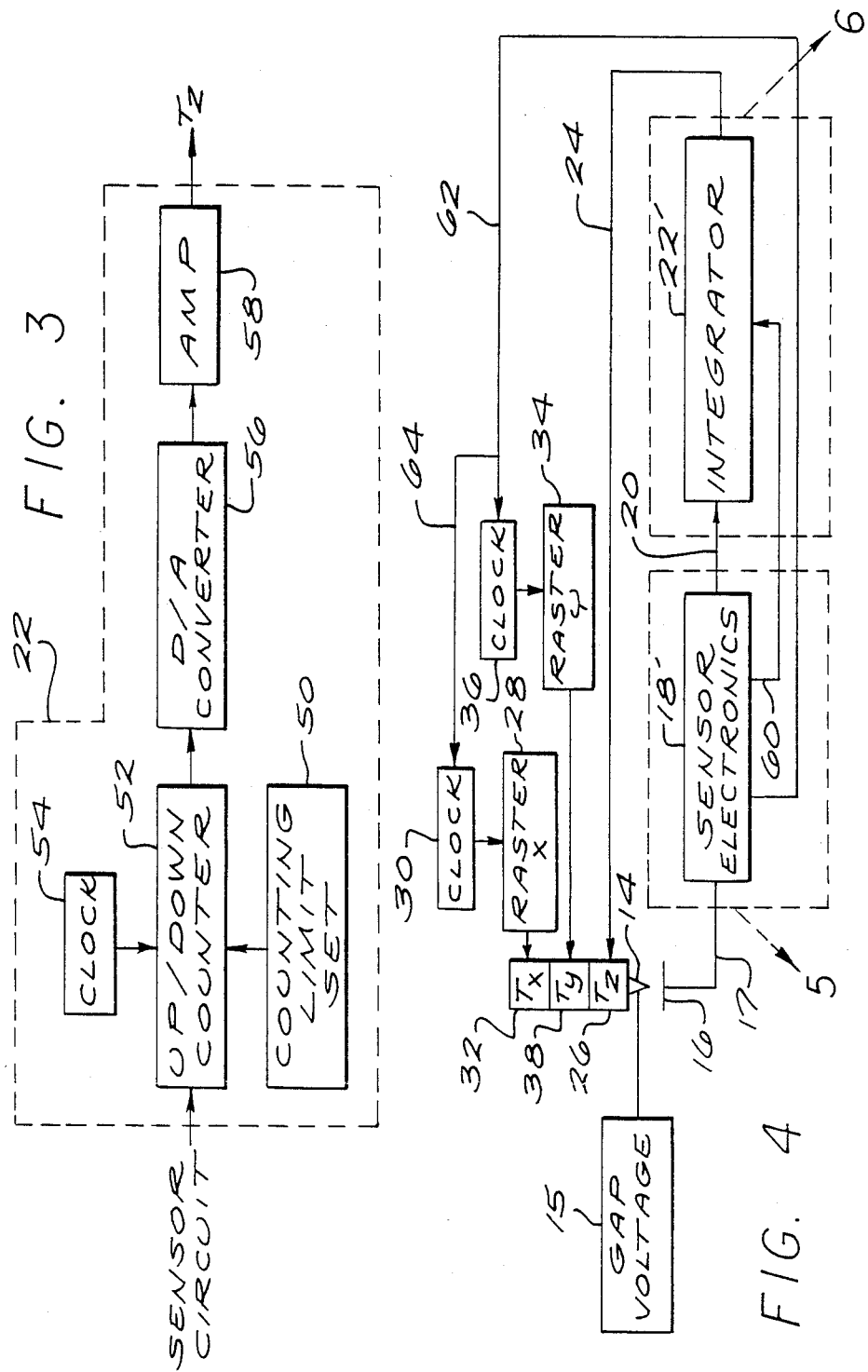

SCANNING MICROMECHANICAL PROBE CONTROL SYSTEM

BACKGROUND OF THE INVENTION

1. Field of the Invention:

This invention relates generally to control devices for position control servosystems, and more particularly relates to adaptive feedback control systems for position control of scanning micromechanical instruments.

2. Description of Related Art:

Various position control servosystems for machining devices and motor drive systems have been developed in industry. Systems for altering feed rate of tool speed to accommodate changes in volume or cross sectional area of a work piece adaptively are known; and a control system for positioning an electrical discharge machining control device utilizing an up/down digital counter for integrating servosignals for calculating a gross position error value is known. Digital speed control systems for sewing machines using a digital rate counter to determine whether to accelerate or decelerate the machine are also known. A closed loop control system for measuring and maintaining a tunnel effect variable constant in a scanning tunnelling microscope is known. Such conventional instruments integrating position signals typically utilize an analog integrating circuit to determine an actual position, an analog to digital converter for determining a digital value corresponding to the position, a logic circuit comparing present position with a commanded position, and a digital counter for determining a position error value, which can then be converted into an analog signal by a digital-to-analog converter for correction of the machine position.

In position control systems requiring extremely fast and precise position corrections, such as for positioning of scanning tunneling microscope probes, it would be desirable to provide such a highly precise and quickly responsive position control system with an adaptive feedback circuit for adjusting the rates of relative movement along the axis of movement of the position control device. It would also be desirable to utilize a circuit design eliminating an analog integrating circuit requiring the time-consuming intermediate analog to digital converter. The present invention meets these needs.

SUMMARY OF THE INVENTION

The present invention provides an improved scanning micromechanical probe control system for controlling relative movement between a sensor probe and an adjacent surface, for an instrument such as a scanning tunnelling microscope in which a tunnelling current passes across a gap between the sensor probe and the adjacent target surface, which is significantly more effective in maintaining a desired gap size, for improved consistency of high resolution scanning not available in the prior art. The feedback control mechanism, along with the rapid and efficient up/down counter mechanism which is used to adjust the size of the probe gap, insure high accuracy and speed of the sensitive instrumentation. A sensor circuit determines the amount of tunnelling current across the gap, to compare the tunnelling current with a reference value for generating a position error signal indicating one of at least two position conditions. An up/down counter integrates the error signal to maintain a running up/down error count, and a position control mechanism adjusts the gap in response to the up/down error count.

Briefly, and in general terms, a scanning apparatus according to the invention includes a sensor for measuring a parameter which varies relative to the relative positioning of the probe and an adjacent surface, adapted to generate an error signal indicating one of at least two discrete position conditions; means for integrating the error signal and for generating an error count signal; and a position control servo for controlling the relative positioning of the probe and the surface responsive to the error count signal.

In a preferred embodiment, the probe control system includes an adaptive feedback control mechanism including at least one adjustable clock for controlling a rate of raster scanning in a plane perpendicular to the axis between the probe and the target surface, wherein the clock is operatively connected to the sensor, and the clock rate of the clock is adjusted in response to the error signal. The adaptive feedback control mechanism most preferably controls the rate of vertical positioning of the probe along a vertical axis in line between the probe and the target surface, and the rate of raster scanning in a horizontal plane.

Other aspects and advantages of the invention will become apparent from the following detailed description, and the accompanying drawings, illustrating by way of example the features of the invention.

BRIEF DESCRIPTION OF THE DRAWINGS

FIG. 1 is a schematic diagram of the feedback electronics for the position control circuitry in a scanning tunneling microscope;

FIG. 2 is a schematic diagram of the gap sensor circuit of FIG. 1;

FIG. 3 is a schematic diagram of the integrator circuit of FIG. 1;

FIG. 4 is a schematic diagram of an alternative embodiment including adaptive feedback control circuitry;

DETAILED DESCRIPTION OF THE INVENTION

Figure 5:
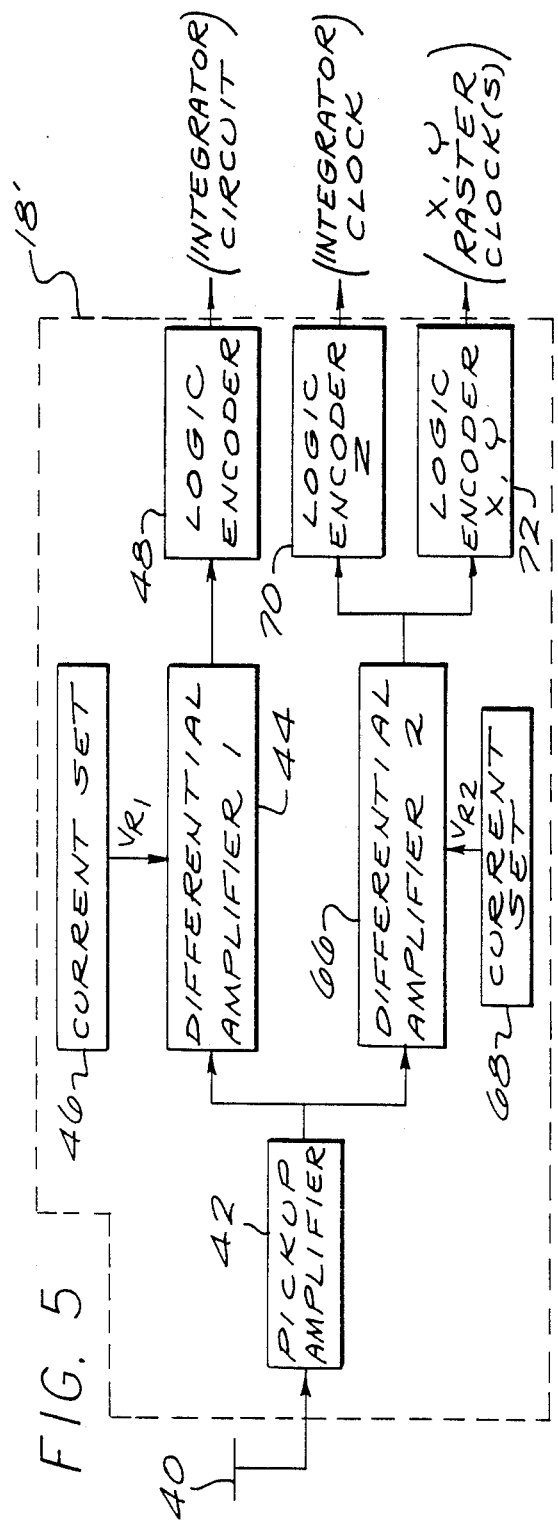
FIG. 5 is a schematic diagram of the sensor circuitry of FIG. 4.

As is shown in the drawings, which are provided for the purpose of illustration, the invention is embodied in a scanning micromechanical probe control system for use in combination with a sensor probe and an adjacent target surface, such as in a scanning tunneling microscope, in which tunnelling current passes across a gap between the sensor probe and target surface. A gap sensor circuit connected between the sensor probe and target surface measures the tunnelling current across the gap, and compares the measured current with a reference current value which can either be preset or dynamically determined, to generate an error signal indicating one of at least two possible position conditions. The error signal is generally a binary signal indicating that the discharge current is less than a threshold amount, or greater than or equal to the threshold amount. The error signal is then received by an up/down counter for digitally integrating the error signal.

The digital count is then converted to an analog signal which is then received by a position control servo mechanism controlling the distance between the sensor probe and the target surface.

Since a scanning tunneling microscope generally scans the sensor probe in an X–Y plane perpendicular to a Z axis between the probe and the target surface, an adaptive feedback control system is also preferably included for accelerating or decelerating the clock sampling rates of the Z axis up/down counter, and for accelerating and decelerating the X axis and Y axis clocks which control the rate of scanning along the X and Y axes. This adaptive feedback control allows a scanning tunneling microscope probe to quickly and precisely react to elevational changes in a target surface as raster scanning proceeds, to maintain an optimum gap distance for consistently high resolution. Although the invention will be described in connection with a typical scanning tunneling microscope, the positioning control and adaptive feedback control of the invention would be equally well suited for use with a scanning capacitance microscope, an atomic force microscope, a scanning magnetic microscope, a scanning thermal microscope, or other scanning micromechanical instruments in which it is useful to maintain either a desired gap, or a desired force of the probe on the target surface, in the case of an atomic force microscope, to achieve constantly high resolution of the instrument. Thus, once the reference parameter is set for optimum sensor resolution, either by an operator, or dynamically by the system itself, the resolution can be maintained during scanning of an entire sample.

In accordance with the invention, there is therefore provided a scanning micromechanical probe control system for controlling relative movement between a sensor probe and an adjacent target surface, comprising sensor means operatively connected between the sensor probe and the target surface for measuring a parameter which varies relative to the relative positioning of the probe and the surface, and adapted to generate an error signal indicating one of at least two possible discrete position conditions; an up/down counter for integrating the error signal, and for generating an up/down count signal; and a position control servo for controlling the relative positioning of the probe and the surface responsive to the up/down count signal.

The invention also provides for a scanning micromechanical probe control system for controlling relative movement between the sensor probe and an adjacent target surface, comprising sensor means operatively connected between the sensor probe and the target surface for measuring a parameter which varies relative to the relative positioning of the probe and the surface and adapted to generate an error signal indicating one of at least two possible discrete position conditions; means for integrating the error signal and for generating an up/down count signal; adaptive feedback control means including at least one raster clock means for controlling a rate of raster scanning in a plane perpendicular to an axis between the sensor probe and the target surface, wherein the raster clock is operatively connected to the means, and the clock rate of the raster clock means is adapted to be adjusted in response to the error signal; and a position control servo for controlling the relative positioning of the probe and the surface responsive to the up/down count signal.

As is shown in the drawings, a scanning tunneling microscope 10 senses the passage of a tunnelling current across a gap 12 between a sensor probe and an adjacent target surface 16. A gap voltage source 15 provides a constant voltage between the sensor probe and the target surface, with the amount of current flow varying as the size of the gap between the probe and the target changes. The current discharged across the gap is carried along line 17 to the gap sensor circuit 18, which compares the measured current with a reference current value and generates a digital signal representing the result of the comparison. The sensor electronics preferably generates a binary digital signal indicating either a state in which the measured current is less than the reference current, indicating the gap is too large, or a state in which the measured current is greater than or equal to the reference current indicating that the gap size is too small. It is of course readily apparent that other digital codes could be generated by the sensor electronics. For example, a two bit code could be used to generate signals indicating alternative gap size states of being two small, exactly as specified, or too large. The ditigal error signal generated by the gap sensor circuit is received by the integrator circuit 22, which generates an analog signal over line 24 representing the accumulated error signal and commanding the probe position control servo 26 to make a corrective adjustment in the gap size.

The tunneling microscope sensor probe is preferably mounted for linear translational motion up and down along a Z axis between the probe and the surface of the target in response to the analog count command signal from the integrator circuitry. For extremely fine adjustment of the gap size, the sensor probe is preferably mounted with a piezoelectric transducer, typically a piezoelectric ceramic stack, which expands along the Z axis when subjected to voltage. Thus, when the gap is relatively large, the current across the gap is relatively low, causing the count in the integrator circuit to decrease. A corresponding voltage increase is directed to the piezoelectric transducer to properly adjust the gap size to the ideal value. Alternatively, the sensor probe could be mounted inversely with a piezoelectric transducer so that as the gap increases the count of the integrator circuit decreases and the voltage level of the piezoelectric transducer would be correspondingly reduced to reduce the size of the gap. Less precise devices for moving the sensor along the Z axis, such as a servo motor, could also be used.

Translational motion in an XY plane perpendicular to the Z axis is preferably performed in a similar manner. Thus, a digital waveform for controlling voltage to an X piezoelectric transducer is produced by a raster X 28 in synchronization with the clock pulses provided by the clock 30, to produce expansion and contraction along an X axis of a piezoelectric position control servo 32. Similarly, the raster Y 34 produces a scanning digital waveform controlling voltage for a Y piezoelectric transducer in synchronization with the clock pulses of clock 36, for producing expansion and contraction of a piezoelectric control servo 38 along the Y axis.

Referring to FIG. 2, the gap sensor circuitry is connected by line 17 to the scanning tunneling microscope probe tip 40 or directly to the target substrate being scanned. The gap sensor circuit includes a pickup amplifier 42, a differential amplifier 44 which compares the measured current as amplified by the pickup amplifier with a reference current either set by an operator or dynamically determined by a current threshold set circuit 46. In the currently preferred embodiment of the gap sensor circuit, a logic encoder 48 produces a binary error signal, with one state indicating that the current level is below the threshold reference, and the other binary state indicating that the measured current is greater than or equal to the reference current. This binary signal is then output to an up/down counter 52 of the integrator circuit. Alternatively, a two bit or higher bit code could be used to generate signals indicating that gap sizes are too small, too large or exactly as specified, or where multiple thresholds are utilized, a digital code with more exact information as to probe position could be generated.

The up/down counter 52 operates to sample the binary signal from the binary encoder at a rate determined by the clock rate of the adjustable clock 54, and accumulates a running count of the binary error signals in a register, between upper and lower counting limits which are determined by the counting limit set circuit 50, so as to prevent the register, which is typically a 16 bit register, from drastically changing the integer count as the count passes through its minimum or maximum value. A digital to analog converter 56 converts the running count from the up/down counter to an analog command signal which may be amplified by the amplifier 58, for instructing the up/down Z axis servo to make a translational adjustment of the sensor probe gap.

Figure 6:
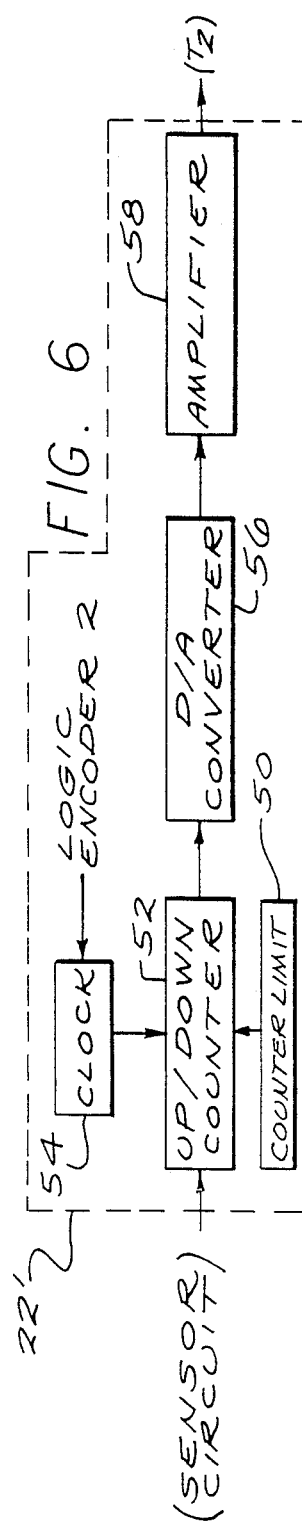
FIG. 6 is a schematic diagram of the integrator circuit of FIG. 4.

Referring to FIGS. 4, 5 and 6, the invention preferably includes feedback control circuitry for adjusting the clock rates of the integrator, and for adjusting the clock rates controlling the X and Y raster waveform production, so that in the event that a large adjustment in the gap size needs to be made, the sampling rate of the of Z axis up/down counter can be increased, and the clock rates for the X and Y raster scanning patterns can be reduced to insure high resolution during the adjustment of the gap size. Conversely, when little or no adjustment of the gap size is required, the clock rates of the X and Y raster scanning patterns can be increased back to normal rates. In this manner, an optimum gap size can be efficiently maintained throughout the entire scanning process.

As is shown in FIGS. 4, 5 and 6, the gap sensor error signal is output from the gap sensor circuit 18' to the clock 54 of the up/down counter 52 to adjust the rate of sampling of the up/down counter. Feedback line 62 similarly is connected to the Y axis raster clock and line 64 is connected to X axis raster clock for adjustment of the translational scanning pattern along the XY plane in response to the binary gap error signal. By continuous adjustment of the clock rates in this fashion, the clocks 54, 36 and 30 operate as integrating circuits in themselves, and adjust their clock rates proportional to the count kept in the up/down counter. In the most currently prefered embodiment, a separate differential amplifier 66 having a separate current set circuit 68 for providing an independent current level comparison generates a signal for a separate logical encoder 70 for the Z axis up/down motion which is output independently to the integrator clock, and for a logic encoder 72 for both the X and Y raster clocks.

Figures 7A, 7B:
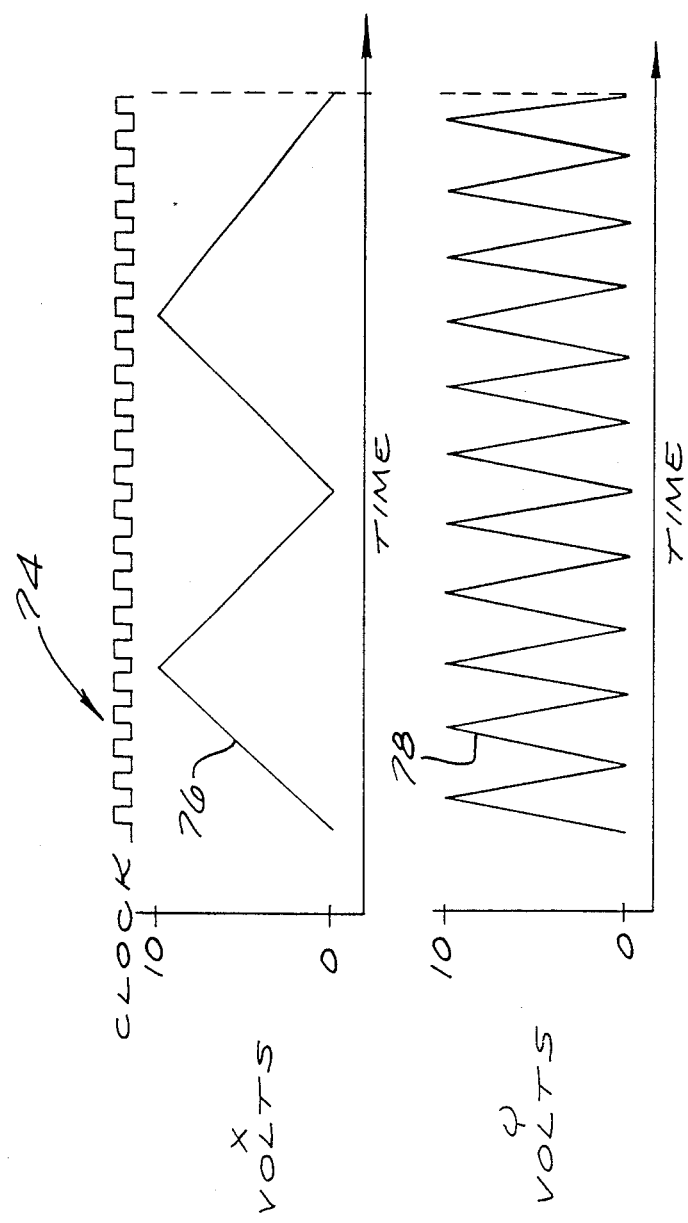
FIG. 7A is a timing diagram of the X raster scanning waveform of the position control apparatus and FIG. 7B is a timing diagram of the Y raster scanning waveform of the position control apparatus.

Illustrative of the manner of synchronization of the scanning digital waveforms of the X and Y raster scanners is the timing diagram shown in FIGS. 7A and 7B clock pulses 74 are generated by the X and Y raster clocks, a relatively slow movement of the X axis piezoelectric position control servo is commanded by the X waveform 76, while a relatively more rapid back and forth scanning pattern is directed by the Y axis waveform 78. In combination, the X and Y raster scanning waveforms generate a scanning pattern which can cover a generally rectangular area several times to produce high resolution data representing the distance of the probe tip from the target surface, which can be used to develop a microscopic topographical map of the target surface.

In view of the foregoing, it has been demonstrated that the scanning micromechanical probe control system of the invention is advantageous in maintaining a desired parameter for maintaining optimum resolution for an instrument such as a scanning tunneling microscope. It is also significant that the present invention provides adaptive feedback control of the sampling and scanning rates of the sensing circuitry and the positioning circuitry to maintain high resolution during adjustment of the gap size. The feedback control mechanism along with the rapid and efficient up/down counter mechanism which is used to adjust the size of the probe gap, insure high accuracy and speed of the sensitive instrumentation.

Although specific embodiments of the invention have been described and illustrated, it is clear that it is susceptible to numerous modifications and adaptations within the ability of those skilled in the art and without the exercise of the inventive faculty. Thus, it should be understood that various changes in form, detail and use of the present invention may be made without departing from the spirit and scope of this invention.

We claim:

1. A scanning apparatus for controlling relative movement between a probe and an adjacent surface, comprising;

sensor means operatively connected between said probe and said surface for measuring a parameter which varies relative to the relative positioning of said probe and said surface;

means for comparing said parameter with a reference threshold, and generating a two-state error signal in which one state of the error signal indicates that the measured parameter is less than said reference threshold, and the other state indicates that the measured parameter is greater than or equal to the reference threshold;

means for integrating said error signal, and for generating an error count signal; and position control servo means for controlling the relative positioning of said probe and said surface responsive to said error count signal.

2. The apparatus of claim 1, wherein said means for integrating said error signal includes an adjustable clock for controlling a sampling rate of the error signal for integrating said error signal.

3. A scanning apparatus for controlling relative movement between a probe and an adjacent surface, comprising;

sensor means operatively connected between said probe and said surface for measuring a parameter which varies relative to the relative positioning of said probe and said surface;

means for comparing said parameter with a reference threshold, and generating an error signal indicating one of at least two possible discrete position conditions;

means for integrating said error signal, and for generating an error count signal;

position control servo means for controlling the relative positioning of said probe and said surface responsive to said error count signal; and adaptive feedback control means including at least one adjustable raster clock means for controlling a rate of raster scanning of said probe relative to said adjacent surface in a plane perpendicular to a probe axis between said probe and said adjacent surface, wherein the adjustable clock means is operatively connected to the sensor means and the adjustable clock means clock rate is adjustable in response to said error signal.

4. The apparatus of claim 3, wherein said means for integrating said error signal includes an adjustable clock controlling a sampling rate of said means for integrating said error signal responsive to said error signal, said adaptive feedback control means includes a first adjustable raster clock for controlling the rate of raster scanning of said probe relative to said adjacent surface along a second axis perpendicular to said probe axis, and a second adjustable raster clock for controlling the rate of raster scanning along a third axis perpendicular to said probe axis and said second axis responsive to the error signal.

5. A scanning micromechanical probe control system for controlling relative movement between a probe and an adjacent surface aligned along a first axis, comprising;

sensor means operatively connected between said probe and said surface for measuring a parameter which varies relative to the relative positioning of said probe and said surface, comparing said parameter with a reference threshold, and generating an error signal indicating one of at least two possible discrete position conditions;

means for integrating said error signal and for generating an error count signal;

adaptive feedback control means including at least one raster clock means for controlling a rate of raster scanning of relative movement between said probe and said surface in a plane perpendicular to the first axis, wherein said raster clock means is operatively connected to said sensor means, and the clock rate of said raster clock means is adapted to be adjusted in response to said error signal; and position control servo means for controlling the relative positioning of said probe and said surface along said first axis responsive to said error count signal.

6. The control system of claim 5, wherein said sensor means generates a two-state error signal in which one state of the binary error signal indicates that said measured parameter is less than said reference threshold, and the other state indicates that said measured parameter is greater than or equal to the reference threshold.

7. The control system of claim 5, wherein said measured parameter is a tunnelling current and said error signal is based upon the difference between said measured tunnelling current and said reference tunnelling current.

8. The control system of claim 7, wherein said sensor means includes means for setting said reference current.

9. The control system of claim 5, wherein said means for integrating said error signal comprises a digital counter including a register for storing an incremented and decremented count, and includes means for setting an upper limit and a lower limit of said count.

10. The control system of claim 5, wherein said means for integrating said error signal includes an adjustable clock for controlling a rate of sampling said error signal.

11. A scanning apparatus for controlling relative movement between a probe and an adjustment surface, comprising;

sensor means operatively connected between said probe and said surface for measuring a parameter which varies relative to the relative positioning of said probe and said surface;

means for comparing said parameter with a reference threshold, and generating an error signal indicating one of at least two possible discrete position conditions;

a digital counter for integrating said error signal and for generating an error count signal, including a register for storing an incremented and decremented count, and including means for setting an upper limit and a lower limit of said count; and position control servo means for controlling the relative positioning of said probe and said surface responsive to said error count signal.

* * * * *

UNITED STATES PATENT AND TRADEMARK OFFICE
CERTIFICATE OF CORRECTION

PATENT NO. : 4,952,857
DATED : August 28, 1990
INVENTOR(S) : Paul E. West, Wilfred P. Charette, Arthur Young It is certified that error appears in the above-identified patent and that said Letters Patent is hereby corrected as shown below:

Column 4, line 20, change "two" to --too--.

Column 5, line 59, change "7B" to --7B.--.

Column 5, line 60, change "clock pulses" to
--As the clock pulses--.

Column 8, line 28 (claim 11), change "adjustment" to
--adjacent--.

Signed and Sealed this

Eighth Day of June, 1993

Attest:

*Attesting Officer*

MICHAEL K. KIRK

*Acting Commissioner of Patents and Trademarks*